Jan. 26, 1960 D. P. PIELOU 2,923,002
ATTITUDE INDICATOR
Filed Jan. 14, 1957 3 Sheets-Sheet 2
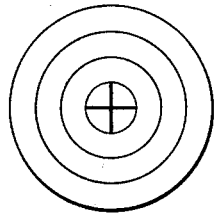
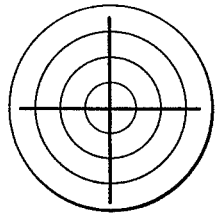
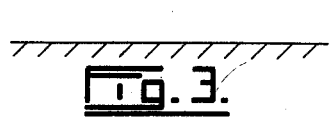
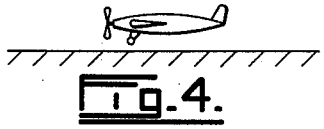
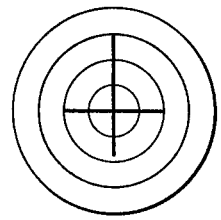
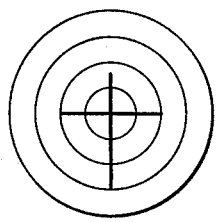
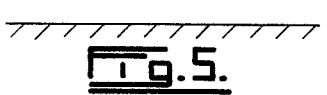
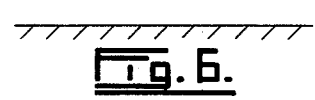
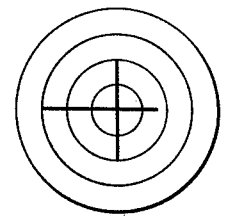
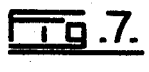
INVENTOR
DOUGLAS P. PIELOU
BY
Featherstonhaugh & Co.
ATTORNEYS

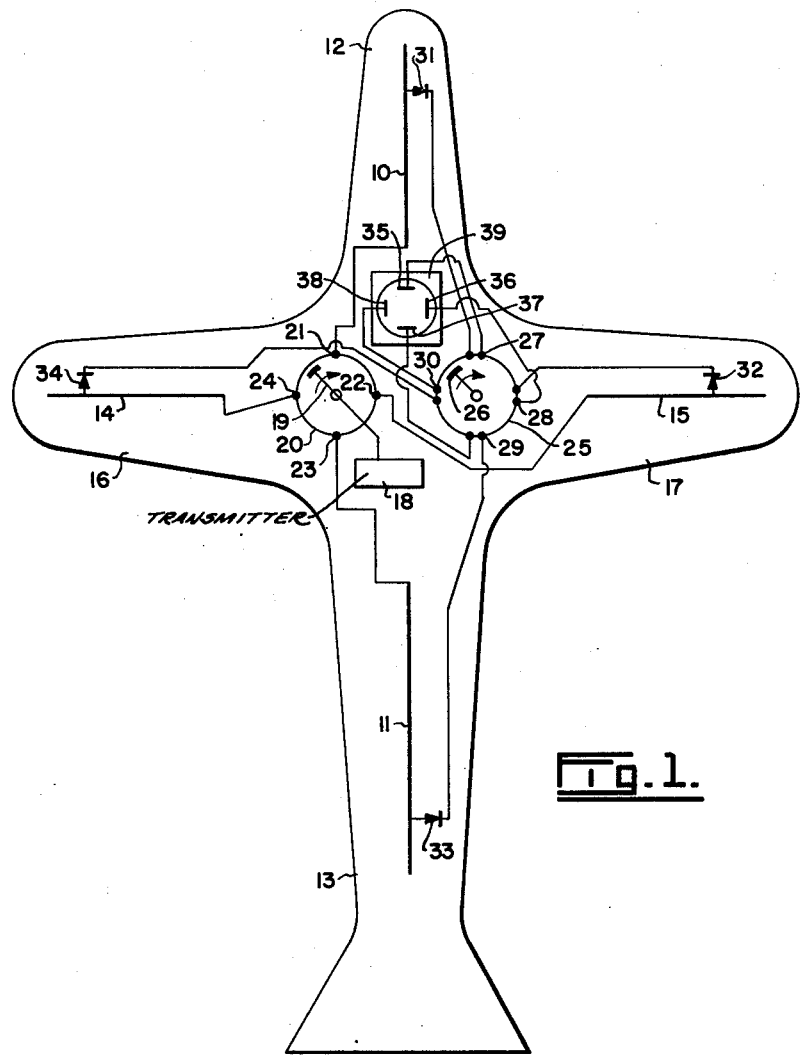

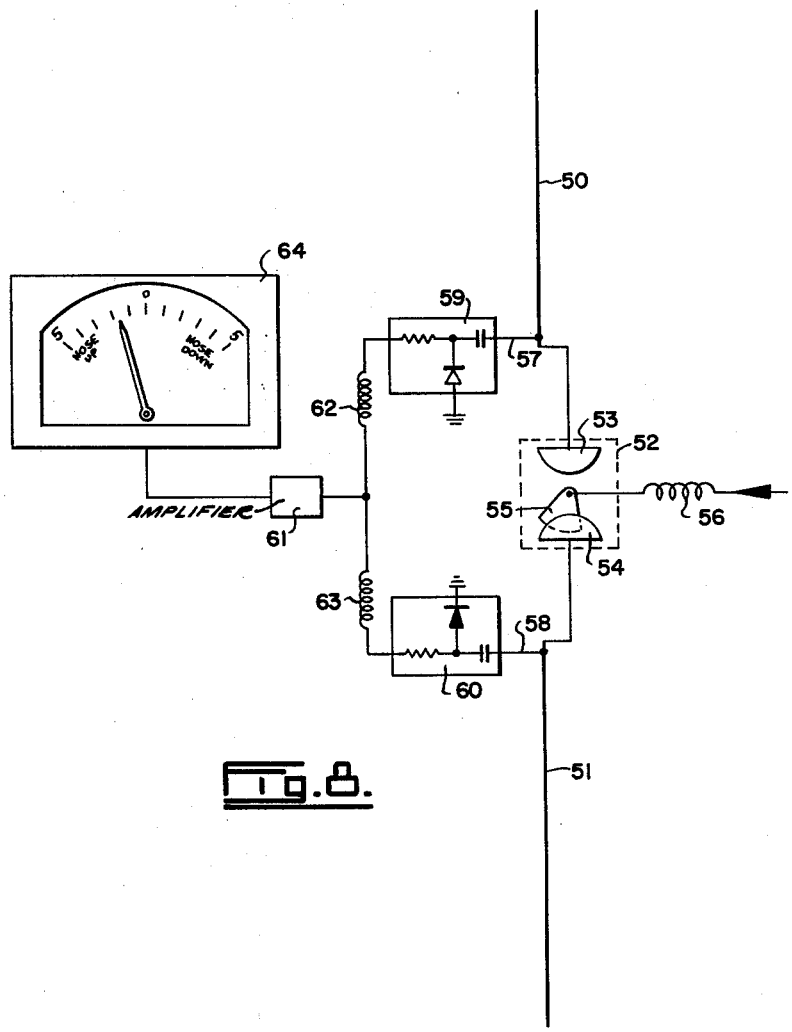

United States Patent Office 2,923,002
Patented Jan. 26, 1960

2,923,002
ATTITUDE INDICATOR
Douglas P. Pielou, Summerland, British Columbia, Canada
Application January 14, 1957, Serial No. 634,008
13 Claims. (Cl. 343—12)

The invention relates to an attitude indicator for a mobile carrier such as an aircraft or a missile, and provides indication of the angular position of the carrier with respect to a known reflecting surface for radio waves.

The present invention is based on the known principle that the impedance or radiation resistance of a radiating antenna is constant at a great distance from a reflecting surface (for example, at a great height from the ground in the case of aircraft) and varies cyclically above and below a mean value as the antenna is brought near the earth or other reflecting surface. These variations go through one cycle of values over a distance from the reflecting surface of approximately one wave length of the radiation being emitted. The variations in the radiation resistance of the antenna result from interference between waves transmitted direct from the antenna with waves previously emitted and then reflected from the ground and the variations are dependent on the distance between the antenna and the reflecting surface in terms of wave length or fractions of a wave length. The amplitude of the variations in radiation resistance increases greatly as the antenna approaches the reflecting surface and, in the last half cycle, the radiation resistance reaches its highest value and then decreases to a value lower than any of its previous values as the antenna reaches the reflecting surface.

The principle just described has been applied to altimeters for aircraft in which a single antenna carried by an aircraft radiates towards the earth and instruments in the aircraft are used to measure the radiation resistance of the antenna. As explained above during the last half cycle of variation of the radiation resistance as the aircraft approaches the ground the measure of radiation resistance can be interpreted in terms of distance of the aircraft from the ground. It has been useful in blind landing systems where it is of particular importance to have an accurate measure of distance to the ground during say the last fifty feet of altitude of the aircraft. These altimeters have been described in the prior art, for example, United States Patent 1,987,587, of January 8, 1935, to F. H. Drake, and in the United States Patent 2,465,723, of March 29, 1949, to D. M. Heller.

In addition to instruments to keep the pilot informed of the distance of the aircraft from the ground during the immediate approach to a runway, and in particular during conditions of zero visibility, it is of great importance that he know the attitude of his aircraft, that is, the angle of descent of the aircraft and the angle of bank. The present invention provides an indicator which not only indicates the distance of the aircraft from the ground when the aircraft is in the immediate vicinity of the ground but also indicates the attitude of the aircraft.

An attitude indicator according to the invention comprises at least one source of radio waves, at least two spaced apart antennas adapted to transmit the radio waves toward a reflecting surface, sensing means adapted to obtain an indication of the radiation resistance of said antennas, and connecting means adapted to connect the antennas to the source of radio waves one at a time periodically in succession. If desired, there may be a source of radio waves connected to each antenna independent of all other antennas, in which case, each wave source is operated at a slightly different frequency from the others. However, the single wave source is preferred. In the preferred form, the sensing means are synchronised with the connecting means to sense one at a time periodically in succession the radiation resistance of each of the antennas. In the case of application of the invention to an aircraft, the two antennas may be spaced apart lengthwise of the aircraft so that comparison of the radiation resistance of the antennas as the aircraft approaches the ground provides an indication of the angle of descent. An advantage of the invention is that an additional pair of antennas may be used, one antenna beneath each wing so that both the angle of descent and the angle of bank of the aircraft can be indicated simultaneously. In a preferred form of the invention the indication is obtained by display on a cathode ray oscilloscope. One set of deflecting plates of the oscilloscope is connected to one pair of antennas, and the other set of deflecting plates is connected to the other pair of antennas. This results in the aircraft being represented on the cathode ray oscilloscope in the form of a cross, the relative lengths of the arms of the cross indicating the attitude of the aircraft while the over-all size of the cross indicates the distance of the aircraft from the ground.

It is of great advantage to the pilot of an aircraft to have an attitude indicator in accordance with the present invention because even though darkness or fog may prevent him seeing the ground during the last fifty feet of his descent, the attitude indicator can give him a constant and accurate indication on one instrument of his distance from the ground, his angle of descent, and his angle of bank.

The invention will be described further with reference to the accompanying drawings, in which:

Figure 1 is a diagrammatic representation of an aircraft equipped with an attitude indicator in accordance with the invention;

Figure 2 is a graph showing the relation between radiation resistance of an antenna and height above the ground;

Figures 3 to 7 are diagrams illustrating the patterns obtained on an oscilloscope type of indicator for different attitudes of an aircraft; and Figure 8 is a diagrammatic circuit diagram of another embodiment of the invention.

The various components shown in the diagram of Figure 1 are each of conventional design and are well known to those skilled in the art, and therefore detailed description of each individual component is not necessary. As shown in Figure 1, two pairs of antennas are fixed beneath the aircraft. The antennas 10 and 11 are fixed respectively beneath the nose 12 of the aircraft and the tail portion 13, while the antennas 14 and 15 are fixed respectively under the left wing 16 and the right wing 17 of the aircraft. A transmitter 18 is located within the aircraft to generate radio waves which are fed to the antennas 10, 11, 14 and 15 through the rotor arm 19 of a switch 20 to the fixed contacts 21, 22, 23, 24 connected respectively to the antennas 10, 15, 11 and 14.

The switch 20 forms one gang of a two-gang rotary switch, the other gang being the switch 25 which forms part of the means for sensing the radiation resistance of the antennas. The switch 25 has a rotary contact 26 adapted to be rotated in synchronism with the rotor 19 of the switch 20 and periodically in succession to short the pairs of contacts 27, 28, 29 and 30 of the switch 25. The pairs of contacts 27, 28, 29 and 30 when shorted by the rotor 26 connect respectively between rectifiers 31, 32, 33 and 34 and the deflecting plates 35, 36, 37 and 38 of a cathode ray oscilloscope 39 mounted at the instrument panel of the aircraft. The cathode ray oscilloscope 39 is one containing appropriate amplifiers for each deflection plate. The rectifiers 31, 32, 33 and 34 are radio frequency rectifiers which connect to appropriate positions on the antennas 10, 15, 11 and 14 in order to obtain D.C. voltage proportional to the radiation resistances of the antennas, as is well known.

The selection of an operating frequency for the attitude indicator depends on the distance from the ground over which it is desired to obtain indications. As explained in the opening paragraphs of this specification it is the last variation in radiation resistance of the antenna as the aircraft approaches the ground which is useful (see Figure 2 in which this operating range is indicated by the portion P—Q of the curve), and therefore an operating wave length should be selected in which this swing in variation of the radiation resistance from maximum to minimum impedance is over the critical vertical distance in the landing of the aircraft. For example, if the antennas are operated at a radio frequency of 7.5 megacycles per second then the last half cycle swing of radiation resistance as the aircraft approaches the ground will occur over a vertical distance of approximately fifty feet. In the case illustrated by Figure 1, if the transmitter 18 is designed to generate a radio frequency of 7.5 megacycles per second the attitude indicator will operate over a vertical distance of approximately fifty feet from the ground. Operation over smaller vertical distances may sometimes be preferred and will give correspondingly greater accuracy. Operation over larger distances is also possible and in this case the antennas will be a small fraction of a wave length long, and relatively inefficient, but inefficiency of the antennas is not a critical problem when the radiation is over such short distances. As shown in Figure 1, the four antennas 10, 15, 11 and 14 may be fed by a single transmitter 18 through the rotary switch 20 which connects the transmitter to each antenna repeatedly in turn so that a steady indication is obtained at the cathode ray oscilloscope 39. At a suitable point on each antenna a voltage tap is made by the rectifiers 31, 32, 33 and 34 and the voltages are amplified if necessary, and each is fed to one of the four deflector plates of the cathode ray oscilloscope 39 through the rotary switch 25 which is driven in synchronism with the rotary switch 20. When the radiation resistance is low, the voltage from the antenna will be high and vice versa. The degree of beam deflection by each deflector plate in the cathode ray oscilloscope 39 therefore corresponds to the voltage on the appropriate antenna, which is normally in inverse relation to the radiation resistance of the antenna, and therefore in direct correspondence to the proximity of the antenna to the ground or landing surface, provided the aircraft is operating within the last half cycle of impedance swing as described above. The trace patterns of the oscilloscope 39 therefore indicate altitude and attitude of the aircraft.

Voltage taps can also be taken from the transmission lines to each antenna, or a voltage can be obtained from a coupling loop near the output tank circuit of the transmitter. Voltage across the tank circuit will be higher when the antenna is radiating poorly, that is, when the radiation resistance is low. The switching arrangement shown in Figure 1 prevents any currents which may be induced by a momentarily live antenna, in the other antennas, from causing unwanted beam deflection at the oscilloscope. Therefore the beam deflection at any moment is caused only by the antenna that is radiating at that moment.

The voltage taps at the antennas and the amplification can be so arranged that at a height of fifty feet (when the radio frequency is 7.5 megacycles as referred to above) a level aircraft produces a very small but symmetrical cross-shaped pattern on the oscilloscope 39. At forty feet in a level aircraft the arms of the cross have increased in length somewhat as shown in Figure 3, indicating higher voltages and lower radiation resistance in each antenna. Near the ground the arms of the cross-shaped pattern grow until they nearly fill the face of the oscilloscope when the aircraft is near touchdown, and if level as in Figure 4. The actual heights of the aircraft above the ground can be read from an annular scale on the face of the oscilloscope.

If the aircraft is inclined nose downwards, the forward antenna (connected to the upper deflector plate 35 of the oscilloscope 39 as shown in Figure 1) is nearer the ground than the rear antenna so that its radiation resistance is lower and its voltage higher than that of the rear antenna. The resulting trace of an oscilloscope for this attitude of the aircraft is shown in Figure 5. In this figure the difference in lengths of the up and down arms of the cross indicate the difference in altitude of the nose and tail of the aircraft and therefore indicate the angle of descent of the aircraft so that the pilot can make any corrections in the angle of descent which may be required. Meanwhile the equal lateral arms of the cross show that the aircraft has no lateral tilt or bank. Figure 6 shows the corresponding pattern with the aircraft's nose higher than its tail.

Figure 7 shows the resulting pattern at the oscilloscope 39 with the aircraft level in the fore and aft direction but with the left wing tip lower than the right (in this figure the rear view of the aircraft is shown). If the right wing tip were lower than the left then the right arm of the cross would be longer than the left. Accordingly these patterns give a visual indication of the angle of bank of the aircraft. If the aircraft is tilted both longitudinally and laterally a completely asymmetrical pattern is obtained. This pattern then indicates visually both angle of longitudinal inclination and angle of bank.

If desired, non-linear amplification of the voltages supplied to the deflector plates of the oscilloscope 39 can be used so that a certain zone of descent is given more detailed consideration than other zones, or amplifying tubes of suitable mu characteristics can be chosen in relation to the curve of radiation resistance change to give a linear relation between altitude and length of the cross arms of the pattern on the oscilloscope 39.

Figure 8 shows the circuit of a more sensitive system for indication of angle of inclination. This system operates on the balancing of voltages from each of a pair of antennas. A pair of antennas 50 and 51 is shown (e.g. the nose and tail antennas). The antennas are connected rapidly in turn to the transmitter by a high speed rotating capacitor switch 52 with two sets 53 and 54 of stators and one rotor 55. The rotor 55 is connected to the output of the transmitter through a common antenna tuning coil 56. One set of stators is connected to each antenna. The capacity values of the stators and rotors are so chosen that when the plates of the rotor 55 mesh fully with one set of stators the connected antenna is in resonance for the frequency of operation so that this antenna is thus energized at this moment and radiates while the other does not. Other switching systems may be used but the one designed has the advantage that the non-radiating antenna is off-tune and therefore less receptive to reflected waves from the first antenna.

A voltage tap 57 or 58 is coupled to each antenna 50 or 51 and the voltages are rectified, with opposite polarity for the two antennas, in the rectifiers 59 and 60. These voltages are then combined and fed into an amplifier 61. Radio frequency chokes 62 and 63 prevent radio frequency interconnection of the two antennas through this circuit. The mean voltage, or resultant voltage, (which may be zero, positive or negative, depending on whether the two antennas are level or inclined one way or the other), after the necessary amplification, is fed to a center-zero meter 64 which is sufficiently damped so as not to record the fluctuations due to the high speed antenna switch 52. This form of the invention gives no information on altitude but gives more sensitive indication of attitude.

The invention is particularly useful for aircraft based on seagoing aircraft carriers because, in an aircraft equipped with the invention moving above the flight deck of the aircraft carrier, a symmetrical pattern on the oscilloscope, or zero reading of the center-zero meter, is obtained when the aircraft is parallel with the deck although the deck may not be horizontal.

Variations in the conductivity of the ground may cause variations in the degree of reflection of radiation. Metallizing the surfaces of runways will tend to provide efficient reflection giving improved results. The fact that such a metallized runway will reflect better than surface soil or unmetallized parts of the airfield is useful in that it provides a way of distinguishing the end of the runway from its surroundings because a sudden change in size in trace on the oscilloscope will occur at the moment the aircraft passes over the end of the runway. When landings are to be made on a non-metallized runway, conductivity of the ground should be known and the equipment adjusted accordingly.

The information may be displayed in other ways than by an oscilloscope or a center-zero meter as described above in connection with use of the invention in an aircraft, for example, audio signals may be used. Also the antenna voltages or other measures of radiation resistance may be used as input signals to servo mechanisms operating automatic controls. An object such as a missile equipped with apparatus according to this invention can obtain information on the position in space of another object, for example, a target, with respect to itself and use the information to operate its automatic controls to guide it toward the target.

As previously stated, in place of the switching arrangements designed to connect each antenna periodically in succession to a single soure of radio waves as described above, each antenna may instead be energized by a separate transmitter or source of radio waves; each of these sources of radio waves being operated at a slightly different frequency, so that radiation and reflection originating from one antenna does not appreciably influence the other antennas. In this example, instead of a single transmitter 18, there would be one for and connected to each of the antennas 10, 11, 14 and 15, gang switch 20 being omitted.

What I claim as my invention is:

1. An attitude indicator for a mobile carrier, said carrier being adapted to be manoeuvred in proximity to a substantially planar reflecting surface for radio waves, said indicator comprising a source of radio waves, at least two spaced apart antennas adapted to transmit said radio waves toward said reflecting surface, sensing means adapted to obtain an indication of the radiation resistances of said antennas, and connecting means adapted to connect said antennas to said source one at a time periodically in succession.

2. An attitude indicator as claimed in claim 1 in which the sensing means is synchronised with said connecting means for sensing one at a time periodically in succession the radiation resistance of each of said antennas.

3. An attitude indicator as claimed in claim 2 in which the sensing means comprises connections to the antennas for obtaining voltages proportional to the radiation resistances of the antennas, means for rectifying each of said voltages, a cathode ray oscilloscope having deflection plates for the cathode ray beam, and connections to said deflection plates for supplying the rectified voltages thereto so that the cathode beam is responsive to the separate radiation resistances of each of the said antennas.

4. An attitude indicator as claimed in claim 3 comprising two pairs of spaced apart antennas arranged so that a line joining the antennas of one pair intersects substantially at right angles a line joining the antennas of the other pair.

5. An attitude indicator as claimed in claim 4 in which the connecting means adapted to connect the antennas to the source of radio wave is one gang of a two-gang rotary switch, the other gang of said switch serving as part of the sensing means to connect each antenna during each period of energization from said source to a deflection plate of the cathode ray oscilloscope.

6. An attitude indicator as claimed in claim 1 in which the sensing means comprises a center-zero meter adapted to display the difference in radiation resistance of the antennas, and the connecting means comprises a rotating capacitor switch adapted to bring each antenna into resonance in succession once during each revolution.

7. An attitude indicator for aircraft comprising a source of radio waves, a first pair of antennas spaced apart lengthwise of the aircraft and adapted to transmit said radio waves toward the ground when said aircraft is in normal flight, a second pair of antennas spaced apart laterally with respect to the longitudinal axis of the aircraft and adatped to transmit said radio waves toward the ground when said aircraft is in normal flight, connecting means adapted to connect the antennas to said source one at a time periodically in succession, and sensing means synchronized with said connecting means for sensing one at a time periodically in succession the radiation resistance of each of the antennas.

8. An attitude indicator for aircraft comprising a source of radio waves, a first pair of antennas spaced apart lengthwise of the aircraft and adapted to transmit said radio waves toward the ground when said aircraft is in normal flight, a second pair of antennas spaced apart laterally with respect to the longitudinal axis of the aircraft and adapted to transmit said radio waves toward the ground when said aircraft is in normal flight, connecting means adapted to connect the antennas to said source one at a time periodically in succession, and sensing means synchronized with said connecting means for sensing one at a time periodically in succession the radiation resistance of each of the antennas, said sensing means being adapted to provide an indication of the difference between the radiation resistances of the antennas of each said pair of antennas.

9. An attitude indicator as claimed in claim 8 in which the sensing means comprises connections to the antennas for obtaining voltages proportional to the radiation resistances of the antennas, means for rectifying each of said voltages, a cathode ray oscilloscope having vertical and horizontal pairs of deflection plates for the cathode ray beam, connections to supply the rectified voltages from one said pair of antennas to one of said pairs of deflection plates, and connections to supply the rectified voltages from the other pair of antennas to the other pair of deflection plates.

10. An attitude indicator for a mobile carrier, said carrier being adapted to be manoeuvred in proximity to a substantially planar reflecting surface for radio waves, said indicator comprising means for generating radio waves, at least two spaced apart antennas adapted to transmit said radio waves toward said reflecting surface, and sensing means for sensing one at a time periodically in succession the radiation resistance of said antennas.

11. An attitude indicator as claimed in claim 10 in which the sensing means comprises a connection to each antenna for obtaining voltages proportional to the radiation resistance of the antenna, means for rectifying each of said voltages, a cathode ray oscilloscope having deflection plates for the cathode ray beam, and connections to said deflection plates for supplying the rectified voltages thereto so that the cathode beam is responsive to the separate radiation resistances of each of the said antennas.

12. An attitude indicator for a mobile carrier, said carrier being adapted to be manoeuvred in proximity to a substantially planar reflecting surface for radio waves, said indicator comprising at least two spaced apart antennas, a source of radio waves connected to each antenna, said antennas being adapted to transmit said radio waves towards said reflecting surface, and sensing means for sensing one at a time periodically in succession the radiation resistance of said antennas.

13. An attitude indicator as claimed in claim 12 in which the sensing means comprises connections to the antennas for obtaining voltages proportional to the radiation resistances of the antennas, means for rectifying each of said voltages, a cathode ray oscilloscope having deflection plates for the cathode ray beam, and connections to said deflection plates for supplying the rectified voltages thereto so that the cathode beam is responsive to the separate radiation resistances of each of the said antennas.

References Cited in the file of this patent

UNITED STATES PATENTS

| | | |
|---|---|---|
| 1,987,587 | Drake | Jan. 8, 1935 |
| 2,449,976 | Busignies | Sept. 28, 1948 |
| 2,488,022 | Miller | Nov. 15, 1949 |
| 2,530,909 | Orturi | Nov. 21, 1950 |